United States Patent [19]

Chu et al.

[11] Patent Number: 5,179,134

[45] Date of Patent: Jan. 12, 1993

[54] PHOTOCURABLE SILICONE COMPOSITION, AND METHOD OF MAKING THE SAME

[75] Inventors: Hsien-Kun Chu, Wethersfield; Robert P. Cross, West Simsbury; David I. Crossan, Hebron, all of Conn.

[73] Assignee: Loctite Corporation, Hartford, Conn.

[21] Appl. No.: 615,200

[22] Filed: Nov. 19, 1990

[51] Int. Cl.$^5$ .......................... C08F 2/50; C08G 77/16; C08G 77/18; C08G 77/20

[52] U.S. Cl. ......................................... 522/37; 522/40; 522/44; 522/46; 522/99; 522/172; 528/26; 528/31; 528/32; 528/34

[58] Field of Search ..................... 522/99, 172, 37, 40, 522/44, 46; 528/31, 32, 26, 34

[56] References Cited

U.S. PATENT DOCUMENTS

| | | | |
|---|---|---|---|
| 4,503,208 | 3/1985 | Lin et al. | 528/15 |
| 4,504,629 | 3/1985 | Lien et al. | 525/288 |
| 4,563,539 | 1/1986 | Gornowicz et al. | 556/421 |
| 4,575,545 | 3/1986 | Nakos | 528/15 |
| 4,575,546 | 3/1986 | Klemarczyk et al. | 526/245 |
| 4,665,147 | 5/1987 | Lien et al. | 528/15 |
| 4,675,346 | 6/1987 | Lin et al. | 522/39 |
| 4,699,802 | 10/1987 | Nakos et al. | 522/99 |
| 4,845,249 | 7/1989 | Arai et al. | 556/440 |
| 4,952,711 | 8/1990 | Jacobine et al. | 522/99 |

FOREIGN PATENT DOCUMENTS

| | | |
|---|---|---|
| 240162 | 10/1987 | European Pat. Off. |
| 262806 | 4/1988 | European Pat. Off. |
| 273565 | 7/1988 | European Pat. Off. |
| 276986 | 8/1988 | European Pat. Off. |
| 332400 | 9/1989 | European Pat. Off. |
| 348106 | 12/1989 | European Pat. Off. |
| 363071 | 4/1990 | European Pat. Off. |
| 3708958 | 9/1988 | Fed. Rep. of Germany |
| 63-10632 | 1/1988 | Japan |
| 63-117024 | 5/1988 | Japan |
| 63-179881 | 7/1988 | Japan |
| 63-185989 | 8/1988 | Japan |
| 02110121 | 10/1988 | Japan |
| 0114226 | 1/1989 | Japan |
| 01279912 | 11/1989 | Japan |
| 01301708 | 12/1989 | Japan |
| 01304108 | 12/1989 | Japan |
| 01318028 | 12/1989 | Japan |

OTHER PUBLICATIONS

"Synthesis of Organosilicon Esters of Hydrazino Carboxylic Acids," Gol'din, G. S., et al., Zhurnal Obshchei Khimii, vol. 43, No. 4, pp. 781–784, Apr. 1973.

Primary Examiner—Marion E. McCamish
Assistant Examiner—Susan Berman
Attorney, Agent, or Firm—Steven J. Hultquist

[57] ABSTRACT

An acryloxy-functional capped silicone formed as a reaction product of:

(i) a silyl diacrylate compound of the formula:

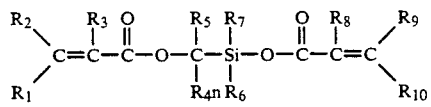

wherein:

$R_1$, $R_2$, $R_3$, $R_4$, $R_5$, $R_6$, $R_7$, $R_8$, $R_9$, and $R_{10}$ are independently selected from hydrogen, halo, and organo radicals; and n is an integer having a value of from 1 to 4; and (ii) a silicone having at least one functionality which is reactive with an acryloxy functionality of the silyl diacrylate compound to yield the acryloxy-functional capped silicone.

The capped silicone may suitably be formulated with an effective amount of a photoinitiator for curing of the acryloxy-functional capped silicone under photoinitiating curing conditions. The silicone functionality which is reactive with the acryloxy functionality of the silyl diacrylate compound may be —OH, or other labile hydrogen-containing substituent. Preferably, the silicone is a hydroxy-terminated linear polydiorganosiloxane. The compositions of the invention are usefully employed as sealants, conformal coatings, potting materials, and the like, and are readily curable with UV radiation.

38 Claims, No Drawings

PHOTOCURABLE SILICONE COMPOSITION, AND METHOD OF MAKING THE SAME

CROSS-REFERENCE TO RELATED APPLICATIONS

Co-filed currently herewith are U.S. application Ser. No. 07/615,185 in the names of Edward K. Welch, II, Robert P. Cross, David I. Crossan, and Hsien-Kun Chu, for "POLYMODALCURE SILICONE COMPOSITION, AND METHOD OF MAKING THE SAME," and U.S. application Ser. No. 07/615,186 in the names of Hsien-Kun Chu, Robert P. Cross, and David I. Crossan, for "PHOTOCURABLE SILICONE GEL COMPOSITIONS, AND METHOD OF MAKING THE SAME."

BACKGROUND OF THE INVENTION

1. Field of The Invention

This invention relates to a photocurable silicone composition comprising an acryloxy-functional capped silicone, and to a method of making same.

2. Description of The Related Art

In the field of silicone chemistry, a variety of silicone compounds, polymers, and formulations have been developed for applications including sealants, conformal coatings, potting materials, and the like. Among the numerous silicone systems developed to date, a wide variety of moisture-curing silicone compositions have evolved, which depend on atmospheric humidity and/or moisture present on the substrate to which the composition is applied, for their cure. Although such moisture-curing silicone systems provide good physical properties and performance when fully cured, they suffer the disadvantage that the moisture curing process is relatively slow.

In consequence, effort has been focused in recent years on silicone compositions having other curing modalities which are significantly faster than the moisture-curing process. In particular, photocurable (e.g., UV-curable) silicones have been developed which offer a fast curing speed, far superior to conventional moisture-curing silicones.

In one such UV-curing silicone system which has come into wide usage, a photocurable silicone polymer is prepared by reacting (a) an isomeric mixture of acryloxypropenyldimethylchlorosilane, comprising the isomers:

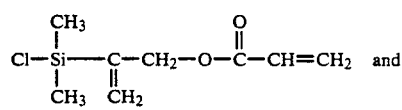 (I)

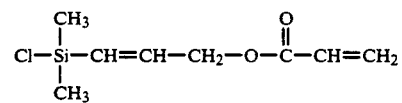 (II)

wherein the isomer (I) is present at a concentration of about 75%–80% by weight of the isomeric mixture, and isomer (II) constitutes the balance thereof, with (b) a hydroxyl-terminated dimethylsilicone fluid of suitable molecular weight, e.g., 20,000–40,000 weight average molecular weight, to yield an acrylic-functional capped silicone polymer. The acrylic-functional capped silicone polymer then is compounded with filler, stabilizer, and a suitable photoinitiator such as benzophenone, to yield a photocurable silicone composition which is very rapidly cured in exposure to UV or other suitable actinic radiation.

The acrylic-functional capper employed to prepare the photocurable silicone polymer described above is typically prepared by selectively hydrosilylating propargyl acrylate at the propargyl group with dimethylchlorosilane. Subsequently, in the endcapping of the hydroxyl-terminated dimethylsilicone fluid using the resulting isomeric mixture described above, hydrogen chloride is generated, necessitating the addition of a basic hydrogen chloride acceptor, e.g., an amine, to the reaction volume. The amine or other acid acceptor functions to prevent the acid from catalyzing the reversion of the dimethylsilicone fluid.

While the above photocurable silicone system functions satisfactorily in many applications and has enjoyed wide commercial usage, it nonetheless suffers from several serious problems.

First, and of utmost importance, propargyl acrylate and its precursor, propargyl alcohol, are highly toxic, and thus require precautionary measures in handling and exposure, to ensure safety in their use.

Second, the process employed to make the acrylic-functional capper is complex and expensive. Propargyl alcohol is first esterified to make the propargyl acrylate, and the acrylate then is carefully hydrosilylated to form the acrylic-functional capper.

Third, the capping process, with a base such as an amine being employed as the hydrogen chloride acceptor, generates a base-complexed hydrochloride which is a solid. The formation of this solid complex necessitates the difficult step of filtering the solid from the viscous polymer, which adds to the cost of the process and the photocurable silicone product.

Fourth, the acrylic-functional capper comprises a constituent, viz., the isomer of formula (I) above, which as a $\beta$-oxygenated silicon compound, is readily susceptible to undergoing $\beta$-elimination reaction. For a discussion of $\beta$-elimination chemistry, see C. Eaborn, "Organosilicone Compounds", Butterworths Scientific Publications, London, 1960, pp. 137–138. Thus, the isomer (I) of the capper mixture may undergo $\beta$-elimination reaction to split off allene, thereby rendering the acrylic-functional capper unstable. Further, the resulting photocurable silicone composition comprising the photocured acrylic-functional capped silicone polymer may likewise be unstable due to the presence of the beta-oxygenated silicon linkage therein.

Accordingly, it would be a significant advance in the art to provide a photocurable silicone composition which can be made without highly toxic reagents in a relatively simple and economic manner, does not require filtering of a viscous polymer product, and comprises a silicone polymer which is capped with an acrylic-functional capper having no $\beta$-oxygenated silicon linkages in its structure.

With respect to the photocurable silicone composition and process of making same which constitute aspects of the present invention and are more fully described hereinafter, related art to the present invention is discussed below.

"Synthesis of Organosilicon Esters of Hydrozino Carboxylic Acids," G. S. Gol'din, et al, *Zhurnal Obshchei Khimii*, Vol. 43, No. 4, Apr., 1973, pp. 781–784, discloses the synthesis of 1,3-bis[(acryloyloxy)methyl]- and 1,3-bis[(methacryloyloxy)methyl]-1,1,3,3-tetramethyldisiloxanes by heating mixtures of chloro(chloromethyl)dimethylsilane with acrylic and methacrylic acids in the presence of triethylamine as hydrogen chloride acceptor, with subsequent hydrolysis of the silyl ester:

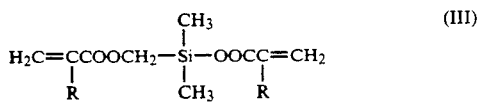

wherein R=H or CH₃.

U.S. Pat. No. 4,845,259 to M. Arai, et al, assigned to Shin-Etsu Chemical Company, Ltd., and Shin-Etsu's Japanese Kokai Tokkyo Koho JP 01 14226, JP 63 179881, JP 63 185989, and European Patent Application EP 276986, describe the synthesis of a silyl acrylic acid diester of formula (III) above, by reaction of potassium or sodium salts of acrylic acid with chloromethyldimethylchlorosilane. Such synthesis, however, has the disadvantage that the acrylic acid salts employed therein are relatively expensive. In accordance with the teachings of these patents, the silyl diacrylate compound (III) is hydrolyzed to form a silanol capper of the formula:

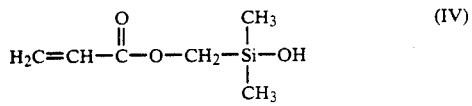

Contemporaneously, dimethylchlorosilane is reacted, in the presence of a platinum hydrosilation catalyst, with a vinyl-terminated dimethylsiloxane polymer to yield a product silicone polymer with chloro terminal groups. The silicone polymer is reacted with the silanol capper in the presence of amine to yield an acryloxy methylterminated polymer of the formula:

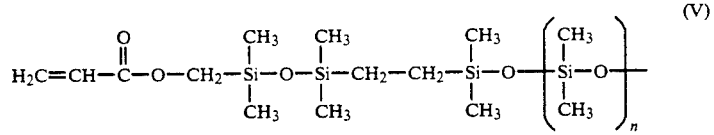

and thereafter the product is filtered to remove the concurrently formed amine hydrochloride complex therefrom.

U.S. Pat. No. 4,563,539 to G. A. Gornowich, et al describes UV-curable acrylofunctional silicones which are formed by reaction of aminoalkyl or diaminoalkyl silicones with isocyanato acrylates.

Other relevant acrylic functional silicone references include: U.S. Pat. No. 4,503,208 (preparation of acrylate and 2-alkyl acrylate silicones which are curable by UV exposure, heat, or anaerobic conditions, by hydrosilation of an acrylate or 2-alkyl acrylate ester of an acetylene alcohol with silicon hydride functional silicones); U.S. Pat. No. 4,575,546 (radiation-curable silicone polymers with a plurality of acrylic groups clustered at or near the chain ends thereof); U.S. Pat. No. 4,575,545 (same); U.S. Pat. No. 4,675,346 (silicone resin with terminal acrylic groups and intermediate region free of acrylic groups, formulated with fumed silica filler and photoinitiator, and curable by UV radiation); U.S. Pat. No. 4,504,529 (graft polymers having α-alkyl acrylate functionality, formed as a reaction product of a silicon hydride grafting agent with at least one α-alkyl acrylate group, and an aliphatically unsaturated polymer, e.g., a polyorganosiloxane); and U.S. Pat. No. 4,655,147 (methacrylated siloxanes prepared by hydrosilation of beta-(allyloxy) ethylmethacrylate using a silicon hydride functional siloxane).

Photocurable siloxane rubber compositions are described in Japanese Kokai Tokkyo Koho JP 01 301708, and European Patent Application 0 240 162 A2 describes liquid polyorganosiloxane compositions that cure by a hydrosilation reaction to yield optically transparent elastomers.

Accordingly, it is an object of the present invention to provide a photocurable silicone composition which may be synthesized using relatively low cost, relatively available materials, which is relatively simple in synthesis procedure, and which avoids the necessity of filtering a highly viscous silicone polymer product to remove by-products therefrom.

It is another object of the invention to provide a photocurable silicone composition in which the silicone polymer is free of β-oxygenated silicon linkages, and whose synthesis can be carried out without highly toxic reactant materials.

Other objects and advantages will be more fully apparent from the ensuing disclosure and appended claims.

SUMMARY OF THE INVENTION

In one aspect, the present invention relates to an acryloxy-functional capped silicone formed as a reaction product of:
(i) a silyl diacrylate compound of the formula:

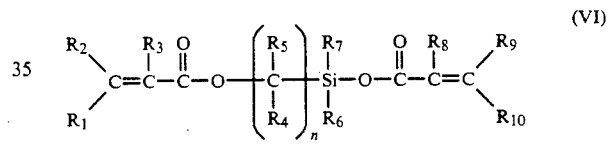

wherein:
$R_1$, $R_2$, $R_3$, $R_4$, $R_5$, $R_6$, $R_7$, $R_8$, $R_9$, and $R_{10}$ are independently selected from hydrogen, halo, and organo radicals; and
n is an integer having a value of from 1 to 4; and
(ii) a silicone having at least one functionality which is reactive with an acryloxy functionality of said silyl diacrylate compound to yield said acryloxy-functional capped silicone.

In another aspect, the invention relates to a photocurable silicone composition comprising the above-described acryloxy-functional capped silicone and an effective amount of a photoinitiator for curing of the acryloxy-functional capped silicone under photoinitiating curing conditions.

The silicone functionality which is reactive with the acryloxy functionality of the silyl diacrylate compound may be located on any suitable portion of the silicone molecule. For example, the acryloxy-reactive functionality of the silicone molecule may be bonded to a silicon atom of the silicone, or such reactive functionality may be bonded to another group in the silicone molecule, e.g., a hydrocarbon bridging group which in turn is joined to a silicon atom or other constituent atom or group in the molecule. Preferably, the acryloxy-reactive silicone functionality comprises a silicon-bonded functional group including a labile hydrogen constituent, with the proviso that such functional group is not hydrogen per se.

By way of illustration, the silicone functionality which is reactive with the acryloxy functionality of the silyl diacrylate compound, may comprise a functionality, e.g., a silicon-bonded functionality, selected from the group consisting of:
—OH;
—N(R')z, wherein each of the R' substituents is independently selected from hydrogen and organo groups, with the proviso that at least one R' substituent is hydrogen;
—SH;
—SO$_3$H; and
where residual acrylic acid groups are present,

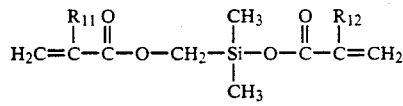

wherein each of the R" and R'" substituents is independently selected from hydrogen and organo groups.

In a particularly preferred aspect, the aforementioned silyl diacrylate has the formula:

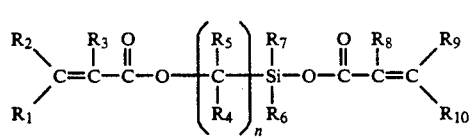

wherein
R$_{11}$ and R$_{12}$ are independently selected from H and methyl; and
the silicone comprises a linear polydimethylsiloxane with terminal —OH groups.

Another aspect of the present invention relates to a photocured silicone material produced by photocuring a silicone composition comprising the above-described acryloxy-functional capped silicone, under conditions photocuringly effective therefor.

Still another aspect of the invention relates to a method of capping (i) a silicone having an active hydrogen-containing functionality, with (ii) acrylic functionality, to render the silicone photocurable under curing conditions optionally including the presence of a suitable photoinitiator therefor, comprising reacting such silicone with a silyl diacrylate compound of the formula:

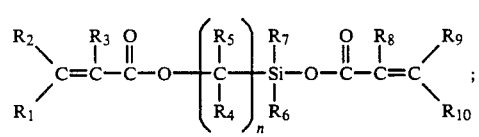

wherein:
R$_1$, R$_2$, R$_3$, R$_4$, R$_5$, R$_6$, R$_7$, R$_8$, R$_9$, and R$_{10}$ are independently selected from hydrogen, halo, and organo radicals;
and n is an integer having a value of from 1 to 4.

A still further aspect of the invention relates to a method of making a silicone composition which is photocurable under photocuring conditions optionally including the presence of a suitable photoinitiator therefor, comprising:
(a) reacting
(i) an acrylic acid compound of the formula:

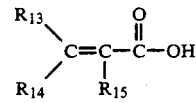

wherein: R$_{13}$, R$_{14}$, and R$_{15}$ are independently selected from hydrogen, halo, and organo radicals, and
(ii) a chlorosilane compound of the formula:

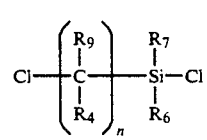

wherein:
R$_4$, R$_5$, R$_6$ and R$_7$ are independently selected from hydrogen, halo, and organo radicals; and
n is an integer of from 1 to 4; in the presence of
(iii) a basic hydrogen chloride acceptor, to yield a silyl diacrylate compound of the formula:

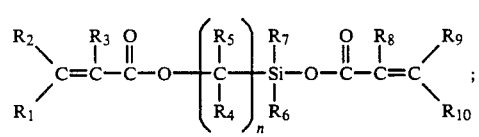

wherein:
R$_1$, R$_2$, R$_3$, R$_4$, R$_5$, R$_6$, R$_7$, R$_8$, R$_9$ and R$_{10}$ are independently selected from hydrogen, halo, and organo radicals;
and n is an integer of 1 to 4; and
(b) reacting the silyl diacrylate compound with a silicone having at least one functionality which is reactive with an acryloxy functionality of the silyl diacrylate compound, to yield an acryloxy-functional capped silicone as the silicone composition.

In another aspect, the present invention relates to a method of capping a silicone having a cappable moiety in its structure, comprising:
reacting a carboxyl functional capper precursor with a chlorosilane compound to yield as a reaction product a silyl capper compound which is cappingly reactive with the cappable moiety of the silicone; and
reacting the silyl capper compound with the cappable moiety of the silicone to yield a capped silicone product.

Other aspects and features of the present invention will be more fully apparent from the ensuing disclosure and appended claims.

DETAILED DESCRIPTION OF THE INVENTION, AND PREFERRED EMBODIMENTS THEREOF

The photocurable composition of the present invention is based on the surprising and unexpected discovery that acrylic-functional capper compounds of the formula:

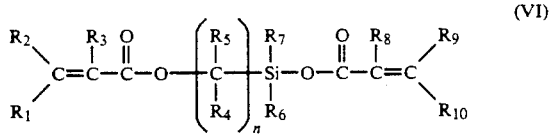
(VI)

wherein:
$R_1$, $R_2$, $R_3$, $R_4$, $R_5$, $R_6$, $R_7$, $R_8$, $R_9$ and $R_{10}$ are independently selected from hydrogen, halo, and organo radicals; and n is an integer having a value of from 1 to 4, may be used to cap silanol-terminated silicone polymers by simply mixing the capper with the silicone polymer for a short period of time at ambient or relatively low elevated temperature, e.g., 100° C., preferably at ambient or room temperature.

For ease of reference in the ensuing discussion, the acrylic functional capper of formula (VI) above will sometimes hereinafter be denoted as the "silyl diacrylate compound," the "silyl diacrylate capper," or more simply the "capper."

The highly efficient reaction of the silyl diacrylate capper with a silanol-ended silicone polymer was very surprising. It is generally perceived that monoacetoxysilanes at best will react with silanols only very sluggishly. It therefore is particularly unexpected that endcapping with the silyl diacrylate capper can take place at room temperature. Indeed, in the patent references of Shin-Etsu Chemical Company, Ltd., which were discussed hereinabove in the "Background of the Invention" section hereof, it is not even contemplated that such a facile reaction could take place. Instead, these references teach to hydrolyze the capper to prepare a silanol compound, contemporaneously with hydrosilylating a vinyl silicone polymer with a chloromethylsilane compound to yield a chloro-terminated silicone polymer. This extensive and circuitous synthetic route to achievement of an acrylic-functional terminated silicone polymer is based on the aforementioned general perception that monoacetoxysilanes will at best react with silanols only very sluggishly, and points up the substantial and unobvious character of the simple, economic methodology used for making the photocurable silicone product in the broad practice of the present invention.

The capper after it is formed by the reaction of a chlorosilane compound and acrylic acid, may subsequently be employed to form a photocurable silicone composition by reacting the capper with a silicone having at least one functionality which is reactive with an acryloxy functionality of the capper, to yield an acryloxy-functional capped silicone.

This acryloxy-functional capped silicone then may be suitably combined with an effective amount of a photoinitiator for curing of the acryloxy-functional capped silicone under photoinitiating curing conditions, to yield a photocurable silicone composition.

Among capper compounds of the general formula (VI) set out broadly hereinabove, a particularly preferred class of such compounds includes those in which $R_1$, $R_2$, $R_3$, $R_4$, $R_5$, $R_8$, $R_9$, and $R_{10}$ are independently selected from hydrogen, halo, and $C_1$-$C_8$ alkyl radicals, and $R_6$ and $R_7$ are independently selected from hydrogen, halo, $C_1$-$C_8$ alkyl, and phenyl. In this preferred class of compounds, n may have a value of 1 to 2, and most preferably is 1. When n is 2, the silyl diacrylate capper is a β-oxygenated silicon compound. As mentioned hereinabove, β-oxygenated silicon compounds have a susceptibility to undergoing β-elimination reaction, but despite this potential occurrence, β-oxygenated silyl diacrylate cappers of the present invention nonetheless are markedly superior to prior art β-oxygenated silicon capper compounds (e.g., the prior art capper compound of formula (I) described in the "Background of the Invention" section hereof), with respect to their ease of synthesis, and the economic advantages and time savings associated therewith. In any event, to minimize stability problems, n in the silyl diacrylate compounds of the present invention may suitably have a value of 1, 3, or 4.

A more specific class of preferred compounds of formula (VI) above includes compounds in which $R_1$, $R_2$, $R_9$, and $R_{10}$ are hydrogen; $R_3$, $R_4$, $R_5$, and $R_8$ are independently selected from hydrogen and $C_1$-$C_8$ alkyl; $R_6$ and $R_7$ are independently selected from $C_1$-$C_8$ alkyl, and phenyl; and n is 1.

A highly preferred silyl diacrylate capper in the practice of the present invention is the silyl diacrylate compound of the formula:

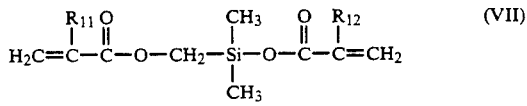
(VII)

wherein $R_{11}$ and $R_{12}$ are independently selected from H and methyl.

The silicone which is reactive with the capper to form the acryloxy-functional capped silicone of the invention, may suitably have a silicone functionality reactive with the acryloxy functionality of the capper, which comprises a so-called "active hydrogen" constituent, e.g., a silicon-bonded functional group including a labile hydrogen constituent.

In general, the reactive functionality of the silicone which is reactive with the acryloxy functionality of the capper, may be located in any suitable part of the silicone molecule, as a terminal group of a silicone backbone, or as an end group of a side chain on the silicone, or otherwise as may be advantageous. Preferably, the silicone reactive functionality is bonded to a silicon atom in the silicone molecule, but such positioning is not required, and the silicone reactive functionality may be joined to any other atoms or groups in the silicone molecule atoms or groups in the silicone molecule, such as to a hydrocarbon bridging group, or other moiety of the silicone molecule.

By way of example, the silicone functionality which is reactive with the acryloxy functionality of the capper, may comprise an active hydrogen-containing functionality, such as a silicon-bonded functionality of such type, selected from the group consisting of:
—OH;
—N(R')$_2$, wherein each of the R' substituents is independently selected from hydrogen and organo groups, with the proviso that at least one R' substituent is hydrogen;
—SH; and
—SO$_3$.

In instances where the capper component reacted with the cappable silicone contains residual acrylic acid groups deriving from the synthesis of the capper, the silicone functionality which is reactive with the capper may be constituted by a functionality, e.g., a silicon-bonded functionality, of the formula:

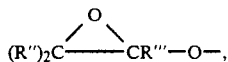

wherein each of the R" and R''' substituents is independently selected from hydrogen and organo groups.

Preferably the active hydrogen-containing functionality is hydroxyl, and such functionality is silicon-bonded.

The silicone which is co-reacted with the capper may suitably comprise a linear polydiorganosiloxane, or other linear silicone, having a weight average molecular weight which may for example range from about 700 to about 300,000, preferably from about 10,000 to about 80,000, and most preferably from about 10,000 to about 50,000.

Although the silicone reacted with the capper to form the acryloxy-functional capped silicone of the invention is preferably linear in conformation, other, non-linear silicones, e.g., branched, cyclic, or macromeric, may potentially usefully be employed in the broad practice of the present invention. Preferably, the silicone (polysiloxane) is predominantly linear in character. The acryloxy-reactive functionality may be located in any suitable portion of the polysiloxane molecule, for example as terminal and/or pendant functionality, but preferably is a terminal functional group, and most preferably, the polysiloxane is a linear molecule both of whose terminal functional groups comprise acryloxy-reactive functional groups, e.g., terminal hydroxy groups. Thus, for example, the polysiloxane material may comprise a hydroxy-terminated polydiorganosiloxane, e.g., a hydroxy-terminated polydimethyl-siloxane, or a hydroxy-terminated polydiphenylsiloxane. Preferably, the silicone is an organo polysiloxane whose organo substituents are predominantly methyl. A particularly preferred polysiloxane material which has been usefully employed in the practice of the present invention is a hydroxy-terminated polydimethylsiloxane of linear configuration, having a weight average molecular weight on the order of 28,000.

As mentioned, the silicone comprising the acryloxy-reactive functionality may be macromeric in character, including polysiloxane resins comprising M, D, T, and Q siloxy units, with at least one acryloxy-reactive functionality, and preferably more than one acryloxy-reactive functionality, per molecule.

As used in the preceding paragraph, the terms M, D, T, and Q units refer to monofunctional, difunctional, trifunctional, and tetrafunctional siloxy units, respectively, as defined in U.S. Pat. No. 4,568,566 to L. A. Tolentino, at column 5, lines 51-55 thereof.

Although the capper and the silicone comprising acryloxy-reactive functionality may be utilized in any suitable proportions relative to one another, consistent with the number of acryloxy-reactive functional groups on the silicone molecule, it generally is preferred to utilize relative amounts of the capper and the acryloxy-reactive silicone providing up to about 1.5 or more equivalents of acryloxysilyl functionality for reaction with the acryloxy-reactive functionality of the silicone, and preferably the equivalents ratio of acryloxysilyl functionality to acryloxy-reactive functionality is from about 1.0 to about 1.2.

If the equivalents ratio of the acryloxysilyl functionality of the capper to the acryloxy-reactive functionality of the silicone is less than 1.0, so that the acryloxy-reactive functionality of the silicone is not fully capped with acryloxysilyl functionality, then photocuring of the resultant partially capped silicone will produce a photocured silicone of a softer (lower durometer) character than the corresponding photocured silicone which is fully capped with acryloxysilyl functionality. Thus, the softness of the photocured product increases with decreasing extent of acryloxysilyl capping. In this manner, it is possible to formulate partially-capped silicones having a soft, gelatinous consistency which may be usefully employed in applications such as sealants, conformal coatings, and potting materials, as more fully described in copending U.S. application Ser. No. 615,186 filed concurrently herewith in the names of Hsien-Kun Chu, Robert P. Cross and David I. Crossan. Such copending application discloses the use of an additional, non-acrylic capper, to cap a portion of the otherwise acryloxy-reactive functional sites on the silicone, so that all cappable reactive functional sites on the silicone are capped, but only a portion are capped with photopolymerizable acryloxysilyl functionality.

It may also be desirable in some applications to utilize a less than stoichiometric amount of the acrylic capper, relative to the acryloxy-reactive functionality present on the silicone, to produce a polymodal-curing silicone, by employing the remaining uncapped functionality to provide another cure modality, either by itself, or as further functionalized by reaction with another capper or other co-reactant. Silicone compositions of such type are more fully disclosed and claimed in copending U.S. application Ser. No. 07/615,185 filed concurrently herewith in the names of Edward K. Welch, II, Robert P. Cross, David I. Crossan, and Hsien-Kun Chu.

The photocurable silicone composition of the present invention may suitably comprise a photoinitiator which may include any photoinitiator known in the art which is effective to cause curing of acrylic functionalities. Potentially useful photoinitiators may include, by way of example, benzoin, substituted benzoins such as benzoin ethyl ether, benzophenone, benzophenone derivatives, Michler's ketone, dialkoxyacetophenones such as diethoxyacetophenone, acetophenone, benzil, and other derivatives (substituted forms) and mixtures thereof. A particularly preferred photoinitiator material is diethoxyacetophenone. Although any suitable effective amount of photoinitiator may be employed in the photocurable silicone compositions of the invention, generally the photoinitiator concentration will usefully be in the range of about 0.1% to about 10% by weight, and more specifically and preferably from about 0.2% to about 5% by weight, based on the weight of the capped silicone.

The photoinitiator employed in the photocurable silicone compositions of the present invention may also be polymer bound. Such photoinitiators are described in U.S. Pat. Nos. 4,477,326 and 4,587,276. Other free radical initiators, such as peroxy thermal initiators may be used in some of the lower molecular weight silicone formulations of the invention.

The compositions of the invention may also include other ingredients to modify the cured or uncured properties of the compositions, as desired for specific end uses.

Fillers or reinforcing materials may usefully be employed in compositions of the present invention to provide enhanced mechanical properties, and in some instances enhanced UV radiation curability of the composition. Among preferred fillers are reinforcing silicas. The reinforcing silicas are fumed silicas which may be untreated (hydrophilic) or treated so as to render them hydrophobic in character.

In general, fillers may be employed at any suitable concentration in the curable silicone composition, but generally are present at concentrations of from about 5% to about 45% by weight, based on the weight of the acryloxy-functional capped silicone. Generally, any other suitable mineralic, carbonaceous, glass, or ceramic fillers may be potentially advantageously employed. Examples include ground quartz, tabular alumina, diatomaceous earth, silica balloons, calcium carbonate, carbon black, titanium oxide, aluminum oxide, aluminum hydroxide, zinc oxide, glass fibers, etc.

In addition, the photocurable silicone composition may also optionally contain an adhesion promoter, to enhance the adhesive character of the composition for a specific substrate (e.g., metal, glass, ceramic, etc.), when the composition is employed as an adhesive for bonding of respective substrate elements. Any suitable adhesion promoter constituents may be employed for such purpose, depending on the specific substrate elements employed in a given application. For example, the adhesion promoter might be selected to enhance adhesion of the composition on substrates comprising materials such as metals, glasses, plastics, ceramics, and mixtures, blends, composites, and combinations thereof. Various organosilane compounds may be usefully employed for such purpose, and such compounds may also desirably feature oxirane functionality, as well as silicon-bonded alkoxy substituents, to provide broad adhesive bonding utility. In such organosilane compounds, the oxirane functionality may be provided by a glycidoxyalkyl substituent on a silicon atom of the silane compound. A particularly preferred adhesion promoter of such type is glycidoxypropyltrimethoxysilane.

In addition, further additives, such as MQ or MDQ resins, can be incorporated, to vary the properties of the silicone composition as desired.

Besides the constituents identified above as being optionally includable in the silicone compositions of the present invention, further optional constituents include anti-oxidants, flame retardants, and pigments, etc., as well as filler adjuvants, e.g., filler-treating agents such as hydroxy-terminated vinylmethoxysiloxane, for filler treatment of quartz or similar fillers when used in the composition.

The photocurable silicone compositions of the present invention may be photocured by exposure to any radiation conditions which are curingly effective for the composition. Suitable radiant energy types which may be usefully employed include electron beam radiation, ultraviolet radiation, visible light radiation, gamma radiation, X-rays, $\beta$-rays, etc. Preferably, the photocuring radiation is actinic radiation, i.e., electromagnetic radiation having a wavelength of about 700 nm or less which is capable of effecting cure of the silicone composition. Most preferably, the photocuring radiation comprises ultraviolet (UV) radiation.

Curing may suitably be carried out in an ambient atmosphere or in an inert atmosphere such as argon or nitrogen. Exposure time required to cure the applied composition varies with such factors as the particular formulation used, type and wavelength of radiation, energy flux, concentration of photoinitiator, and thickness of the coating, but it is generally quite short, that is, less than about 3 minutes. Exposing the composition to excessive amounts of radiation may "overcure" the composition, resulting in poor physical and performance properties. The amount of radiation which is excessive varies with the given formulation, coating thickness, radiation source, etc., and may easily be determined by the skilled artisan without undue experimentation.

In some instances, it may be feasible to photocure the silicone composition without any constituent photoinitiator therein, however it is generally desirable to utilize a photoinitiator to initiate the curing of the acryloxy-functional capped silicone, by substantial polymerization thereof.

In the preferred synthesis of the acryloxy-functional silicone employed in the broad practice of the invention, the following sequence of reaction steps is carried out:

(a) reacting (i) an acrylic acid compound of the formula:

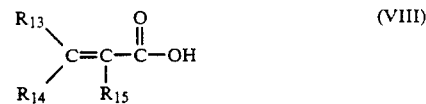

wherein: $R_{13}$, $R_{14}$, and $R_{15}$ are independently selected from hydrogen, halo, and organo radicals, with (ii) a chlorosilane compound of the formula:

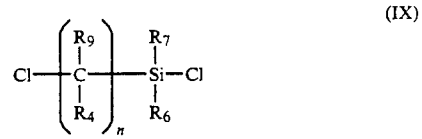

wherein:
$R_4$, $R_5$, $R_6$ and $R_7$ are independently selected from hydrogen, halo, and organo radicals; and
n is an integer of from 1 to 4;
in the presence of (iii) a basic hydrogen chloride acceptor, to yield a silyl diacrylate compound of the formula:

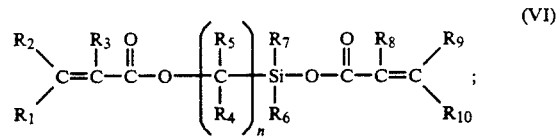

wherein:
$R_1$, $R_2$, $R_3$, $R_4$, $R_5$, $R_6$, $R_7$, $R_8$, $R_9$ and $R_{10}$ are independently selected from hydrogen, halo, and organo radicals; and
n is an integer having a value of from 1 to 4; and (b) reacting the silyl diacrylate compound with a silicone having at least one functionality which is reactive with an acryloxy functionality of the silyl diacrylate compound, to yield an acryloxy-functional capped silicone as the silicone.

It will be appreciated that the acrylic acid component employed in the above-described reaction may comprise a mixture of compounds each of the general formula (VIII), e.g., a mixture of acrylic acid and methacrylic acid. Likewise, the chlorosilane co-reactant may be a mixture of chlorosilane species each of the general formula (IX) above, e.g., a mixture of chloromethyldimethylchlorosilane and chloromethyldiphenylchlorosilane. In such instance, the product silyl diacrylate will likewise comprise a mixture of correspondingly differently substituted silyl diacrylate compound species.

Generally, and preferably, the reaction of the acrylic acid compound(s) and the chlorosilane compound(s) is conducted in a diluent medium, preferably a non-reactant hydrocarbon or halohydrocarbon medium, e.g., heptane. Generally, and preferably, the reaction volume is stirred during the reaction, such as may be accommodated by the provision of mechanical mixing means in the reaction vessel.

In carrying out the reaction of the acrylic acid compound(s) with the chlorosilane compounds, it is generally advantageous to use a base such as triethylamine to function as a hydrogen chloride acceptor, thereby removing the hydrogen chloride formed in the reaction. In some instances, it may be feasible to remove the hydrogen chloride by-product by sparging the reaction mixture with nitrogen, whereby the passage of nitrogen through the mixture removes the hydrogen chloride.

The reaction may be carried out at any suitable temperature; generally, temperatures on the order of from about 25° C. to about 100° C. are usefully employed, and preferably from about 25° C. to about the reflux temperature of the diluent medium in which the reaction is carried out, e.g., about 100° C. for heptane as the diluent medium. The time required to carry out the reaction may be readily determined for a given reaction system by simple analytical tests without undue experimentation, and the reaction time may be varied as necessary or desirable in a given application. By way of example, the reaction may be carried out in approximately 3-4 hours in a diluent medium of heptane at reflux temperatures. After the reaction has been carried out, the reaction mixture may optionally be subjected to vacuum stripping or other suitable treatment for the removal of residual acrylic acid from the reaction mixture, as and to the extent desired.

It will be appreciated that the synthesis methodology of the present invention achieves a substantial advance in the art over the prior art practice of capping the silicone by reacting it with an isomeric mixture of acryloxypropenyldimethylchlorosilanes, as described hereinabove in the "Background of the Invention" section hereof. In the prior art synthesis, the generation of hydrochloric acid necessitates the addition of an amine in the process to function as the acid acceptor, resulting in a complexed amine hydrochloride solid which then must be filtered from the viscous capped silicone polymer, a step which is time-consuming, difficult, and costly.

By contrast, in the practice of the present invention, the synthesis of the capper per se is associated with the generation of hydrogen chloride, which then can be base amine complexed in the reaction mixture. Accordingly, whereas filtration of the capped polymer is required by the prior art synthesis method, the amine-complexed hydrogen chloride solid in the practice of the practice of the present invention is readily removable by filtration from the relatively low viscosity capper material, before the capper is reacted with the silicone, thereby achieving a significant advantage over the prior art methodology, in terms of processing time, ease of synthesis, and cost of the capped silicone product.

It will also be appreciated that the specific reaction scheme described above for capping a silicone by reaction with a silyl diacrylate compound, is an aspect of a capping methodology which may be broadly applied in the capping of silicones with other capping species, utilizing a carboxyl functional capper precursor which is reactive with a chlorosilane compound to yield the desired capper.

Thus, the present invention comprehends a method of capping a silicone having a cappable moiety in its structure, comprising the steps of:

reacting a carboxyl functional capper precursor with a chlorosilane compound to yield as a reaction product a silyl capper compound which is cappingly reactive with the cappable moiety of the silicone; and reacting the silyl capper compound with the cappable moiety of the silicone to yield a capped silicone product.

The above-described broad capping methodology may for example be used to impart acetoxy functionality to a silicone, by reacting acetic acid with a dichlorosilane compound to yield as reaction product a diacetoxysilane. This resulting capper compound can be reacted with a silicone containing interior, terminal and/or pendant hydroxyl functionality (or other labile hydrogen-containing functionality) to yield an acetoxy-functionalized silicone which is believed to be an inert (non-reactive) siloxane. Other suitable carboxyl functional capper precursors may be employed to yield silyl cappers of desired functionality which in turn may be employed to correspondingly functionalize the silicone, in order to impart a desired cure modality thereto, or otherwise to appropriately functionalize the silicone for its intended purpose.

The features and advantages of the present invention are more fully illustrated by the following non-limiting examples, wherein all parts and percentages are by weight, unless otherwise expressly stated.

EXAMPLE 1

A 12 liter three neck round bottom flask equipped with a mechanical stirrer, and condenser, were charged with 7.5 liters of heptane. 720 ml acrylic acid, 1900 ml triethylamine and 616 g of chloromethyldimethylchlorosilane then was sequentially added to the heptane solution under nitrogen atmosphere. The mixture was stirred at 100° C. for 5 hours and then filtered and stripped to give 929 g of the crude acryloxymethyldimethylacryloxysilane. GC analysis indicated the crude materials had a high purity of >90%. The crude product can be further vacuum distilled at 0.5 mmHg and ~70° C. to improve its purity, if necessary.

EXAMPLES 2-8

Samples of acryloxymethyldimethylacryloxysilane prepared in accordance with the procedure of Example 1 were mixed in various ratios with a hydroxy-ended polydimethylsiloxane having a viscosity of 2000 cps., at room temperature for 15 minutes. To each mixed sample was further added 15% (w/w) diethoxyacetophenone. The mixtures then were cast as 75 mil films and irradiated for one minute per side with 70 mW/cm$^2$ UV radiation using a medium pressure mercury vapor lamp. The hardness values of the photocured films then were determined using a Shore 00 Durometer. Results are shown in Table I below, including the equivalents ratio of acryloxy functionality to acryloxy-reactive functionality in each sample.

TABLE I

| Example | Wt of Capper (Example 1) | Wt of Silicone | Shore 00 Durometer Hardness | Equivalents Ratio |
|---|---|---|---|---|
| Example 2 | 1.8 g | 150 g | No cure | 0.5 |
| Example 3 | 2.7 g | 150 g | 28 | 0.75 |
| Example 4 | 3.6 g | 150 g | 57 | 1.0 |
| Exmaple 5 | 4.5 g | 150 g | 61 | 1.25 |
| Example 6 | 5.4 g | 150 g | 75 | 1.50 |
| Example 7 | 6.3 g | 150 g | 76 | 1.75 |
| Example 8 | 7.2 g | 150 g | 76 | 2.0 |

EXAMPLES 9–11

Samples of the acryloxymethyldimethylacryloxysilane capper of Example 1 were mixed in various ratios at room temperature for 5 minutes with a hydroxylended polydimethylsiloxane having a viscosity of 3500 cps. The mixtures then were vacuum stripped at 100° C. for 30 minutes. Thirty-two percent (w/w) of a surface treated hydrophobic fumed silica (surface area=150 m$^2$/g) then was added to each of the mixtures and the mixtures were further mixed at room temperature for 15 minutes. To each of the mixtures was further added 1.5% diethoxyacetophenone, with 10 minutes additional mixing. The mixtures then were cast as 75 mil films and irradiated with 70 mW/cm$^2$ UV light using a medium pressure mercury vapor lamp. The hardness, tensile strength, and elongation of the cured elastomers were determined. Results are shown in Table II below.

TABLE II

| Example | Wt. Capper (Example 1) | Wt. of Silicone | Wt. of Silica | Durometer Shore A Hardness | Tensile Strength psi | Elongation (%) |
|---|---|---|---|---|---|---|
| 9 | 3.10 g | 150 g | 48 g | 24 | 591 | 391 |
| 10 | 3.60 g | 150 g | 48 g | 34 | 786 | 359 |
| 11 | 4.10 g | 150 g | 48 g | 41 | 878 | 333 |

EXAMPLE 12

Example 1 was repeated but using methacrylic acid instead. Thus, in a 1000 ml round bottom flask, 600 ml of heptane, 20 ml of methacrylic acid, and 35 ml of triethylamine were sequentially added with stirring. To this mixture was further added 14.3 g chloromethyldimethylchlorosilane. The mixture then was heated to 100° C. for 4 hours. The mixture was cooled and filtered to remove the triethylamine hydrochloride salt and stripped to remove the solvent and yield 35 g of a crude yellowish liquid. Fifteen grams of this crude liquid were added to 150 g of hydroxyl-ended polydimethylsiloxane with a viscosity of 3500 cps. The mixture was stirred and then stripped at 60° C., 0.5 mm Hg for one hour. One percent (w/w) of diethoxyacetophenone was added to this mixture, and a 75 mil film was cast. The film was irradiated with a 70 mW/cm$^2$ UV light for 2 minutes per side using a medium pressure mercury lamp. The film photocured to an elastomer with a hardness of 62 as measured by Shore (00) Durometer.

EXAMPLE 13

The formulations of sealants shown in Table III below were made up, in which Sealant A and Sealant B were of identical composition except for the acrylic functionality-capped silicones therein. Sealant A employed a silicone polymer (Polymer A) which was formed by reacting a 28,000 weight average molecular weight hydroxy-terminated polydimethylsiloxane with an isomeric mixture of acryloxypropenyldimethylchlorosilane of formulas (I) and (II) described hereinabove, in a weight ratio of 75–80% (I) to 20–25% (II). Sealant B employed a silicone polymer (Polymer B) which was formed by reacting a hydroxy-terminated 28,000 weight average molecular weight polydimethylsiloxane with a capper of formula (VI), acryloxymethyldimethylacryloxychlorosilane, in accordance with the present invention. Both silicone polymers were fully capped, as shown by the absence of any detectable free silanol (SiOH) functionality.

TABLE III

|  | Sealant A | Sealant B |
|---|---|---|
| Polymer | Polymer A | Polymer B |
|  | 3.50 kg | 3.50 kg |
|  | 75.0% | 75.0% |
| Fumed Silica | 1.10 kg | 1.10 kg |
|  | 23.5% | 23.5% |
| Diethoxyacetophenone | 71.2 | 71.2 g |
| (DEAP) photoinitiator | 1.5% | 1.5% |
| Stabilizer$^a$ | 1.50 g | 1.50 g |
|  | 0.03 % | 0.03% |
| Total | 4.67 kg | 4.67 kg |

$^a$1:1 50% BHT in toluene: 50% MEHQ in IPA

The silicone fluid used to prepare Polymer A and Polymer B was Mazer Masil ™ SFR 3500 cps hydroxy terminated polydimethylsiloxane silicone fluid. The fumed silica filler was Wacker HDK-2000 treated fumed silica. The photoinitiator was Upjohn diethoxyacetophenone (DEAP). The stabilizers used in these sealant formulations were Eastman Kodak 4-methoxyphenol (MEHQ) and Eastman Kodak 4-methyl-2,6-di-t-butylphenol (BHT).

The capper which was used to prepare the capped silicone polymer for Sealant B was made by the following procedure. 143 g (1.0 mole) of chloromethyldimethylchlorosilane (Petrarch Systems) was reacted with a mixture of 150 g (2.1 moles) acrylic acid (Aldrich 99% grade) and 215 g (2.13 moles) triethylamine (Aldrich 99% grade) in 1000 g n-heptane (J. T. Baker) at reflux for 4 hours. Heptane, acrylic acid, and triethylamine were first added to a round bottom flask with a mechanical stirrer, nitrogen bubbler, condenser, and heating mantle. The chloromethyldimethylsilane then was added to the flask. The reaction mixture was stirred for 4 hours at reflux. The product mixture then was cooled and filtered to remove the triethylamine hydrochloride. Solvents were removed by distillation under reduced pressure.

The reaction yield is essentially quantitative but the actual yield depends much upon the amount of product loss during filtration and stripping. The product capper, acryloxymethyldimethylacryloxysilane, is very reactive with water. It should be stored in a tightly sealed glass container. Although quite stable at room temperature, the capper may advantageously be refrigerated to ensure shelf-life. Acrylate polymerization inhibitor such as 400 ppm 4-methoxyphenol (MEHQ) is desirably added to the capper.

Polymer B was prepared by mixing 3500 cps hydroxy silicone fluids with the acryloxymethyldimethylacryloxysilane capper. The molar excess of capper is 0% based on the assumed 28,000 molecular weight of the silicone fluid (71 μeq) or 545 based on molecular weight derived from FTIR silanol analysis (46 μeq). Although heat is not necessarily required during the capping reaction it is generally desirable to ensure full end-capping. The capped silicone product was heated for 3 hours under vacuum (1 mm Hg). The resulting capped silicone was then wipe film evaporated with two passes to remove most of the low molecular weight components.

Polymer A was made by an analogous procedure, using an isomeric mixture of compounds of formulae (I) and (II) as the capping species.

The sealants, Sealant A and Sealant B, were made in a Jaygo Mixer using the same batch size as well as heating, mixing, and vacuum conditions in both cases. The capped silicone fluid in each case was charged to the mixer kettle, and fumed silica was added. After the "wetting" of the fumed silica, the batch was mixed for two hours under vacuum while full steam was applied to the kettle jacket. The batch then was cooled, and the remaining ingredients were added. After a short, gentle mixing under vacuum, the batch was transferred into cartridges. Slabs of sealant, 5"×5"×0.075", were cured in a UV chamber while contained by a 6"×6"×0.075" steel frame between a 1 mm polyethylene sheet and then two ¼" glass plates. The samples were secured with clamps and then exposed to 75 mW/cm² light (medium pressure mercury lamp) for one minute on each side to effect curing thereof. The following physical properties of the cured materials were determined: durometer (Shore A hardness), tensile strength, elongation, and modulus at 100% and 200% elongation. The results are shown in Table IV below. The tabulated values for tensile strength, % elongation, and modulus are median values based on measurement of five samples in each instance.

TABLE IV

|  | Sealant A | Sealant B |
|---|---|---|
| Durometer, Shore A Hardness | 34 | 36 |
| Tensile strength, psi | 454 | 689 |
| % Elongation | 277 | 310 |
| Modulus @ 100% Elongation | 116 | 144 |
| Modulus @ 200% Elongation | 279 | 359 |
| Hexane Extractables, % | 4.5 | 4.2 |

The above results indicate that while both Sealant A and Sealant B yield good initial cured properties, Sealant B was clearly superior to Sealant A.

EXAMPLE 14

To 60 g of hydroxy-terminated polymethylphenylsiloxane (viscosity=2400 cps; Baysilone polymer 3176) was added 2.2 g acryloxymethyldimethylacryloxysilane and 0.6 g diethoxyacetophenone at room temperature. The mixture was stirred for 30 seconds and de-aired for 5 minutes. The mixture then was cast in a 75 mil thickness film and irradiated in a medium pressure mercury vapor UV chamber for 1 minute per side with a 70 mW/cm² UV intensity. The material cured to an elastomer having a Shore (00) durometer hardness of 62.

In general, the capped silicone compositions of the present invention displayed excellent cured characteristics, and also exhibited superior performance results in a variety of evaluation tests, including humidity aging, heat aging, oil immersion, and antifreeze immersion, both initially and after extended exposure to the test conditions.

While the invention has been described with reference to specific features and embodiments thereof, it will be appreciated that numerous variations, modifications, and alternative embodiments exist, and all such variations, modifications, and embodiments are to be regarded as being within the spirit and scope of the invention.

What is claimed is:

1. An acryloxy-functional capped silicone, formed as a non-hydrolysis reaction product of:
(i) a silyl diacrylate compound of the formula:

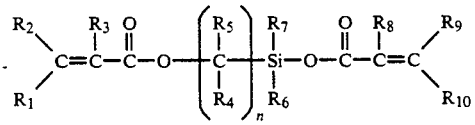

wherein:
$R_1$, $R_2$, $R_3$, $R_4$, $R_5$, $R_6$, $R_7$, $R_8$, $R_9$, and $R_{10}$ are independently selected from hydrogen, halo, and organo radicals; and n is an integer having a value of from 1 to 4; and
(ii) a silicone having at least one functionality which is reactive with an acryloxy functionality of said silyl diacrylate compound to yield said acryloxy-functional capped silicone.

2. A composition according to claim 1, wherein $R_1$, $R_2$, $R_3$, $R_4$, $R_5$, $R_8$, $R_9$, and $R_{10}$ are independently selected from hydrogen, halo, and $C_1$-$C_8$ alkyl radicals, and $R_6$ and $R_7$ are independently selected from hydrogen, halo, $C_1$-$C_8$ alkyl, and phenyl radicals.

3. A composition according to claim 1, wherein n has a value of from 1 to 2.

4. A composition according to claim 1, wherein:
$R_1$, $R_2$, $R_9$, and $R_{10}$ are hydrogen;
$R_3$, $R_4$, $R_5$, and $R_8$ are independently selected from hydrogen and $C_1$-$C_8$ alkyl;
$R_6$ and $R_7$ are independently selected from $C_1$-$C_8$ alkyl, and phenyl; and
n is 1.

5. A composition according to claim 1, wherein:
$R_1$, $R_2$, $R_4$, $R_5$, $R_9$, and $R_{10}$ are hydrogen;
$R_3$ and $R_8$ are independently selected from hydrogen and methyl;
$R_6$ and $R_7$ are methyl; and
n is 1.

6. A composition according to claim 1, wherein said silicone functionality which is reactive with the acryloxy functionality of the silyl diacrylate compound, comprises a functional group including a labile hydrogen constituent.

7. A composition according to claim 1, wherein said silicone functionality which is reactive with the acryloxy functionality of the silyl diacrylate compound, is a functionality selected from the group consisting of:
—N(R')$_2$, wherein each of the R' substituents is independently selected from hydrogen and organo groups, with the proviso that at least one R' substituent is hydrogen;
—SH;
—SO$_3$H; and

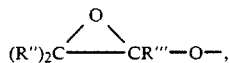

wherein each of the R' and R''' substituents is independently selected from hydrogen and organo groups;

with the proviso that said silicone functionality is

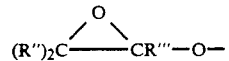

only when the silyl diacrylate compound is present with residual acrylic acid groups deriving from the synthesis of the silyl diacrylate compound.

8. A composition according to claim 1, wherein the silicone having at least one functionality reactive with an acryloxy functionality of said silyl diacrylate compound, comprises a linear polydiorganosiloxane.

9. A composition according to claim 8, wherein said at least one reactive functionality of said silicone comprises a terminal reactive functional group.

10. A composition according to claim 1, wherein said silicone having at least one functionality reactive with an acryloxy functionality of said silyl diacrylate compound, comprises a linear silicone with hydroxy functional groups at its termini.

11. A composition according to claim 10, wherein said linear silicone has a weight average molecular weight of from about 700 to about 300,000.

12. A composition according to claim 1, wherein the reaction by which the reaction product is formed, is characterized by an equivalents ratio of acryloxysilyl functionality to acryloxy-reactive functionality of from about 1.0 to about 1.2.

13. A composition comprising a capped silicone according to claim 1, and an effective amount of a photoinitiator for curing of said capped silicone under photoinitiating curing conditions.

14. A composition according to claim 13, wherein the photoinitiator comprises a compound selected from the group consisting of benzophenone, benzoin, acetophenone, benzil, and their substituted forms, and mixtures thereof.

15. A composition according to claim 13, wherein the photoinitiator comprises diethoxyacetophenone.

16. A composition according to claim 13, further comprising a stabilizer.

17. A composition according to claim 13, further comprising a filler.

18. A composition according to claim 1, wherein said silyl diacrylate has the formula:

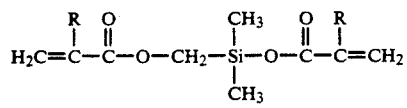

wherein: R is H or methyl; and said silicone comprises a linear polydimethylsiloxane with terminal —OH groups at both ends.

19. A photocured silicone material produced by photocuring a composition comprising an acryloxy-functional capped silicone according to claim 1, under conditions photocuringly effective therefor.

20. A method of capping (i) a silicone having functionality which is reactive with acryloxy functionality, with (ii) acryloxy functionality to render the silicone photocurable in character, comprising non-hydrolyzingly reacting said silicone with a silyl diacrylate compound of the formula:

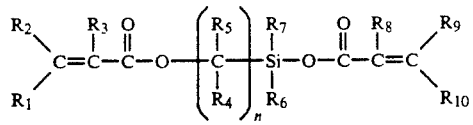

wherein:

$R_1$, $R_2$, $R_3$, $R_4$, $R_5$, $R_6$, $R_7$, $R_8$, $R_9$, and $R_{10}$ are independently selected from hydrogen, halo, and organo radicals, and n is an integer of from 1 to 4.

21. A method according to claim 20, wherein n has a value of 1.

22. A method of making a silicone composition which is photocurable under photocurable conditions optionally including the presence of a suitable photoinitiator therefor, comprising:

(a) reacting (i) an acrylic acid component of the formula:

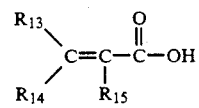

wherein: $R_{13}$, $R_{14}$, and $R_{15}$ are independently selected from hydrogen, halo, and organo radicals;

with (ii) a chlorosilane compound of the formula:

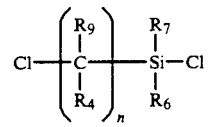

wherein:

$R_4$, $R_5$, $R_6$ and $R_7$ are independently selected from hydrogen, halo, and organo radicals; and n is an integer of from 1 to 4;

to yield a silyl diacrylate compound of the formula:

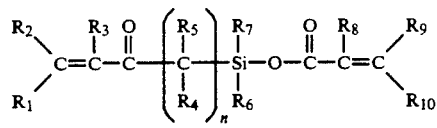

wherein:

$R_1$, $R_2$, $R_3$, $R_4$, $R_5$, $R_6$, $R_7$, $R_8$, $R_9$ and $R_{10}$ are independently selected from hydrogen, halo, and organo radicals; and n is an integer of from 1 to 4; and (b) non-hydrolyzingly reacting the silyl diacrylate compound with a silicone having at least one functionality which is reactive with an acryloxy functionality of the silyl diacrylate compound, to yield an acryloxy-functional capped silicone as the silicone composition.

23. A method according to claim 22, wherein $R_1$, $R_2$, $R_3$, $R_4$, $R_5$, $R_8$, $R_9$, and $R_{10}$ are independently selected from hydrogen, halo, and $C_1$-$C_8$ alkyl radicals, and $R_6$ and $R_7$ are independently selected from hydrogen, halo, $C_1$-$C_8$ alkyl, and phenyl radicals.

24. A method according to claim 22, wherein:
$R_1$, $R_2$, $R_9$, and $R_{10}$ are hydrogen;
$R_3$, $R_4$, $R_5$, and $R_8$ are independently selected from hydrogen and $C_1$-$C_8$ alkyl;
$R_6$ and $R_7$ are independently selected from $C_1$-$C_8$ alkyl and phenyl; and
n is 1.

25. A method according to claim 22, wherein:
$R_1$, $R_2$, $R_4$, $R_5$, $R_9$, and $R_{10}$ are hydrogen;
$R_3$ and $R_8$ are independently selected from hydrogen and methyl;
$R_6$ and $R_7$ methyl; and
n is 1.

26. A method according to claim 22, wherein said silicone functionality which is reactive with the acryloxy functionality of the silyl diacrylate compound, comprises a functional group including a labile hydrogen constituent.

27. A method according to claim 22, wherein said silicone functionality which is reactive with the acryloxy functionality of the silyl diacrylate compound, comprises a functionality selected from the group consisting of:
—OH;
—N(R')$_2$, wherein each of the R' substituents is independently selected from hydrogen and organo groups, with the proviso that at least one R' substituent is hydrogen;
—SH;
—SO$_3$H; and

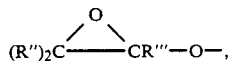

wherein each of the R" and R'" substituents is independently selected from hydrogen and organo groups; with the proviso that said silicone functionality is

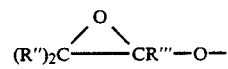

only when the silyl diacrylate compound is present with residual acrylic acid groups deriving from the synthesis of the silyl diacrylate compound.

28. A method according to claim 22, wherein said silicone having at least one functionality which is reactive with an acryloxy functionality of the silyl diacrylate compound, comprises a linear polydiorganosiloxane.

29. A method according to claim 28, wherein said at least one reactive functionality of said silicone comprises a terminal reactive functional group.

30. A method according to claim 22, wherein said silicone having at least one functionality which is reactive with an acryloxy functionality of the silyl diacrylate compound, comprises a linear silicone with hydroxy functional groups at its termini.

31. A method according to claim 30, wherein said linear silicone has a weight average molecular weight of from about 700 to about 300,000.

32. A method according to claim 22, comprising providing from about 1.0 to about 1.2 equivalents of acryloxysilyl functionality for reaction with the acryloxy-reactive functionality of said silicone.

33. A method according to claim 22, wherein said silyl diacrylate has the formula:

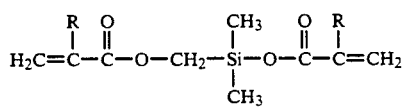

wherein: R is H or methyl; and said silicone comprises a linear polydimethylsiloxane with terminal —OH groups at both ends.

34. A method according to claim 22, further comprising forming a photocurable silicone composition by mixing said acryloxy-functional capped silicone with a photoinitiator.

35. A method according to claim 34, wherein the photoinitiator is selected from the group consisting of benzophenone, benzoin, acetophenone, benzil, and substituted forms thereof, and mixtures thereof.

36. A method according to claim 34, wherein the photoinitiator comprises diethoxyacetophenone.

37. A method according to claim 34, further comprising exposing said photocurable silicone composition to radiation photocuringly effective therefor, to yield a photocured silicone composition.

38. A method according to claim 37, wherein said radiation comprises ultraviolet radiation.

* * * * *

UNITED STATES PATENT AND TRADEMARK OFFICE
CERTIFICATE OF CORRECTION

PATENT NO. : 5,179,134
DATED     : January 12, 1993
INVENTOR(S) : Chu, et al.

It is certified that error appears in the above-identified patent and that said Letters Patent is hereby corrected as shown below:

In the Abstract, the moiety should be changed from

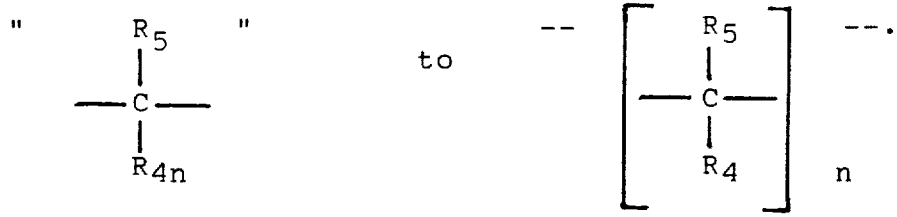

Column 5, line 15, change "N(R')$_z$ to --N(R')$_2$--.
Column 14, line 62, change "15%" to --1.5%--.

Column 18, claim 7, line 4, after "consisting of:" the text should read --

--OH;

--N(R')$_2$--.

Signed and Sealed this

Eighth Day of February, 1994

*Attest:*

BRUCE LEHMAN

*Attesting Officer*   Commissioner of Patents and Trademarks